United States Patent [19]

Brosig

[11] Patent Number: 5,029,623
[45] Date of Patent: Jul. 9, 1991

[54] PROCESS FOR FILLING A LIQUID CRYSTAL CELL

[75] Inventor: Stefan Brosig, Stuttgart, Fed. Rep. of Germany

[73] Assignee: Nokia Unterhaltungselektronik, Pforzheim, Fed. Rep. of Germany

[21] Appl. No.: 505,604

[22] Filed: Apr. 6, 1990

[30] Foreign Application Priority Data

Apr. 7, 1989 [DE] Fed. Rep. of Germany ....... 3911359

[51] Int. Cl.$^5$ .......................... B65B 31/02; G02F 1/13; G09F 9/00
[52] U.S. Cl. .......................................... 141/7; 141/1; 141/4; 141/65; 141/31
[58] Field of Search .................... 141/31, 1, 4, 5, 7, 141/8, 9, 11, 12, 59, 65, 69, 71, 73, 80, 82; 156/99, 145, 148, 130–105

[56] References Cited

U.S. PATENT DOCUMENTS

| | | | |
|---|---|---|---|
| 3,701,368 | 10/1972 | Stern | 141/1 |
| 4,064,919 | 12/1977 | Stern et al. | 141/7 |
| 4,091,847 | 5/1978 | Sorkin | 141/7 |
| 4,098,301 | 7/1978 | Bloom et al. | 141/7 |
| 4,713,925 | 12/1987 | Kafkis | 141/31 X |
| 4,753,276 | 6/1988 | Inaba et al. | 141/7 |
| 4,922,972 | 5/1990 | Watanabe et al. | 141/4 |
| 4,972,974 | 5/1990 | Watanabe et al. | 141/4 |

FOREIGN PATENT DOCUMENTS

| | | | |
|---|---|---|---|
| 0007015 | 1/1977 | Japan | 141/7 |
| 0168627 | 12/1981 | Japan | 141/1 |
| 0168633 | 12/1981 | Japan | 141/1 |

Primary Examiner—Ernest G. Cusick
Attorney, Agent, or Firm—Peter C. Van Der Sluys

[57] ABSTRACT

After it has been evacuated, a liquid crystal cell whose filling hole is located at a corner of the cell is immersed into a liquid crystal material inside a vacuum jar and immediately raised again, whereby a drop of liquid crystal material forms at the filling hole. Then the vacuum jar is quickly aerated and the cell is filled outside the vacuum jar. The volume of the drop and the volume of the cell have to be brought into line with each other in such a way that the drop volume is at least as great as the volume of the cell interior so that filling can take place with the drop volume only. Due to the fact that filling is accomplished by a method which only involves lowering the liquid crystal cell a short distance, raising it and then holding it with the filling hole downwards until the volume of the drop which has formed following immersion in and withdrawal from the liquid crystal material is completely sucked into it, the process is extremely simple and entails no great device expense while being reliable in operation. A further advantage is that the vacuum jar is occupied for the shortest possible time.

9 Claims, 1 Drawing Sheet

PROCESS FOR FILLING A LIQUID CRYSTAL CELL

BACKGROUND OF THE INVENTION

1. Field of the Invention

The invention concerns a process for filling a liquid crystal cell with a liquid crystal material.

2. Description of the Prior Art

Liquid crystal material is generally a mixture of different liquid crystal substances. It should be noted that for the sake of brevity, liquid crystal cells hereinafter will be referred to to cells.

Various processes for filling cells with liquid crystal material are known. A first process involves lowering an evacuated cell until it is immersed in liquid crystal material in a container inside the vacuum jar. The vacuum jar is then slowly aerated, whereby the liquid crystal material is forced into the cell interior. The speed of aeration is dependent on the viscosity of the liquid crystal material. A too rapid influx of the material must be avoided because this could result in a change in the orientation properties of orientation layers or spacers could be flushed out of position. On the other hand, the inflow speed should not be too low because of the need to obtain a sufficiently high production output. It is therefore common to heat liquid crystal material of high viscosity, e.g. ferroelectric or smectic material so that it flows sufficiently quickly through the filling hole into the cell interior.

According to another process, the filling hold, pointing upwards, of a cell is supplied with liquid crystal material. Aeration is quickly performed, the cell is removed from the vacuum, placed in an over and its filling hold is connected with a reservoir of liquid crystal material.

According to a third process, a liquid crystal cell is placed with its filling hold upwards in a vacuum jar. The filling hole is supplied with a quantity of liquid crystal material sufficient to fill the whole cell interior. The vacuum jar is then slowly aerated so that filling can occur.

SUMMARY OF THE INVENTION

The process for filling a liquid crystal cell with a liquid crystal material according to the invention is characterized by the following steps:

evacuation of the liquid crystal cells in a vacuum jar, lowering of the evacuated liquid crystal cell until its filling hold, which is located in a corner of the cell, is immersed in a container of liquid crystal material, raising of the liquid crystal cell until the corner with the filling hole have emerged from the liquid crystal material, whereby a drop of liquid crystal material remains attached to the said corner, and whereby the volume of the liquid crystal cell is dimensioned so that the drop volume is sufficient to fill the cell interior, rapid aeration of the vacuum jar and, removal of the liquid crystal cell from the vacuum jar and holding it with its filling hole downwards until the cell interior is filled by the liquid crystal material of the attached drop.

The process according to the invention is characterized by an extreme simplicity. No special device inside the vacuum jar is necessary to attach liquid crystal material to a filling hole. The drop is attached by simply immersing the cell and its filling hold in the liquid crystal material and then raising it from the liquid crystal material. To ensure that as little liquid crystal material as possible is lost during this process step, a cell is used with a filling hold located at a cell corner. By means of this lowering and raising process, the filling holes of a whole stack of cells can simultaneously receive respective drops of liquid crystal material. It is also unnecessary to move separate filling devices from the filling hole of one cell to the filling hole of the next cell when several cells are placed in a vacuum jar. A further important advantage is that the vacuum jar is occupied only for the period of time required for evacuation but not additionally for filling a cell. For this reason the number of expensive and trouble-prone vacuum jars required for a given production output is fewer than when also filling takes place inside the vacuum jar.

The process according to the invention can be carried out with all kinds of liquid crystal material—smectic or ferroelectric material of high viscosity or nematic material of low viscosity. The optimum temperature for creating a drop of the desired size is obtained by heating (for high-viscosity material) or by cooling (for low-viscosity material). If necessary, the cell is also warmed or cooled at least in the filling hole region.

DETAILED DESCRIPTION OF THE DRAWINGS

Figure 1:
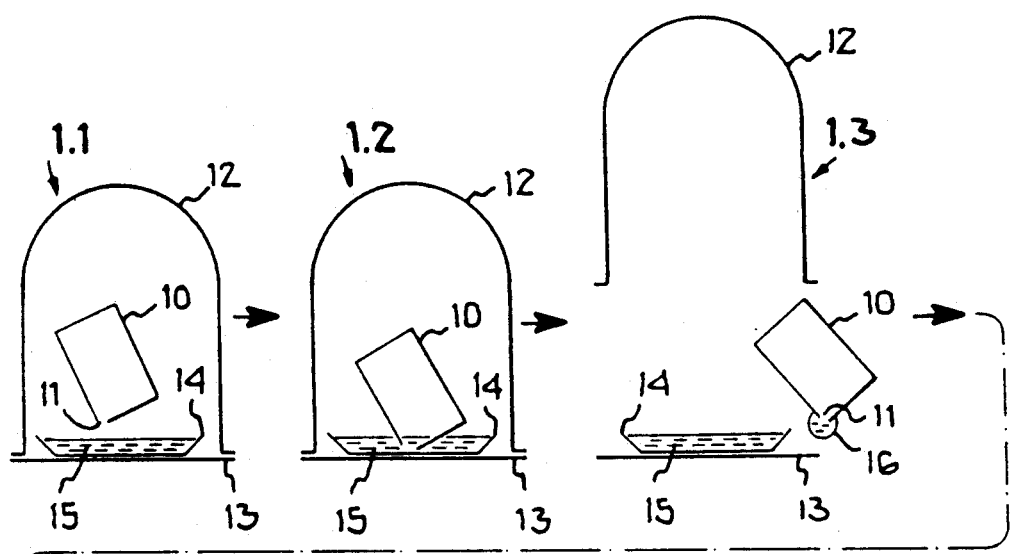
Figure 2:
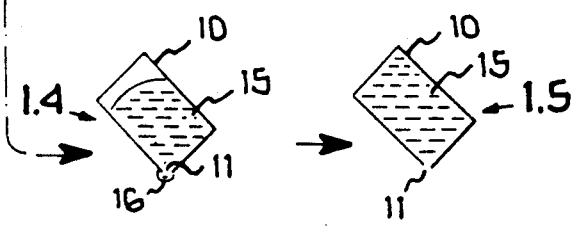
Figure 2:
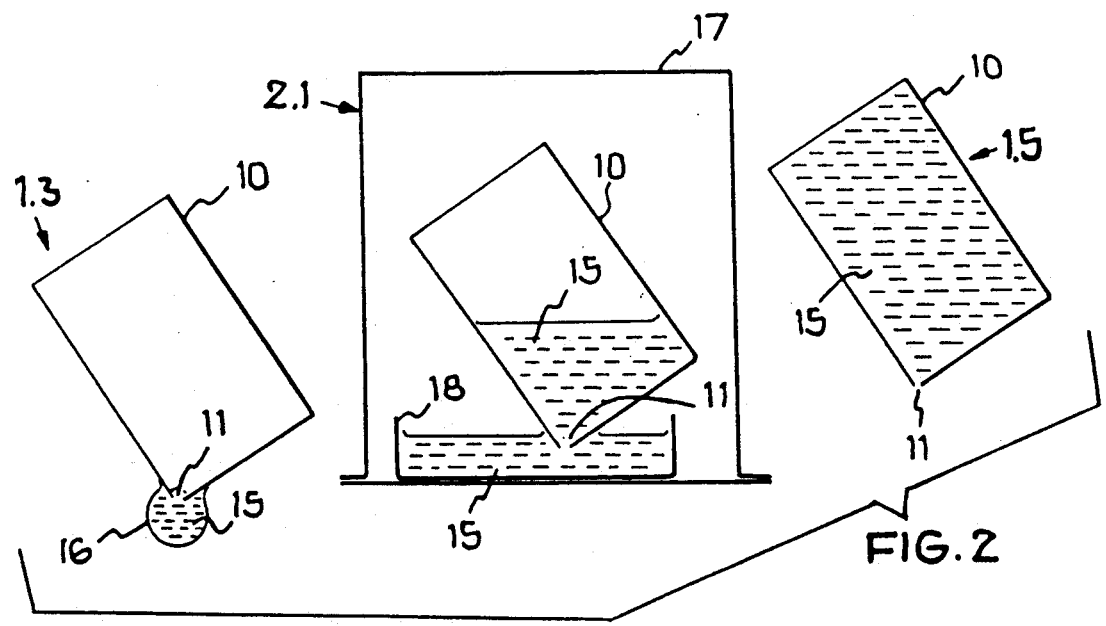

FIG. 1 is a schematic representation of five process steps 1.1–1.5 for filling a cell of small volume; and FIG. 2 is s schematic representation similar to that of FIG. 1, with three process steps, the first coinciding with the process step 1.3 and the last with the process step 1.5 according to FIG. 1, process step 1.4, however, being replaced by process step 2.1.

DETAILED DESCRIPTION OF THIS PREFERRED EMBODIMENTS

In a process step which is designated 1.1 in FIG. 1, a liquid crystal cell 10 with a filling hole 11 pointing downwards is positioned in a vacuum jar 12. On the floor of the vacuum jar 13 there is a boat 14 containing liquid crystal material 15. The vacuum jar 12 is evacuated, whereby the cell 10 is also evacuated through the filling hole 11.

In the process step 1.2, the cell 10 is lowered so far towards the floor 13 that its filling hole 11 is immersed in the liquid crystal material 15.

In the representation of a following step 1.3, the vacuum jar can be seen raised from the floor 13. The cell 10 is raised until it is no longer immersed in the liquid crystal material 15 in the boat 14 and can be removed from the vacuum jar 12. Its filling hole 11 is now closed by a liquid crystal drop 16.

In a following process step 1.4, the liquid crystal drop 16 is heated until it becomes so fluid that the liquid crystal material can be sucked into the cell 10. Finally, essentially the whole volume of the drop 16 is sucked into the cell, as depicted by step 1.5. The filling process is then terminated.

The process according to FIG. 1 is practicable when the volume of the cell 10 is relatively small. If a relatively large volume must be filled, the process according to FIG. 2 is used.

The process illustrated in FIG. 2 contains the steps 1.1–1.3 already described. However, step 1.3 is succeeded by step 2.1 in which the liquid crystal cell 10 is placed in an oven 17 containing an over boat 18 containing liquid crystal material 15. The cell 10 is immersed with its filling hole in the liquid crystal material 15. The cell 10 remains in the oven until it is filled, as depicted on the far right of FIG. 2. The last step is designated 1.5 in both FIG. 2 and FIG. 1. It should be noted that the filler hole 11 is finally closed with adhesive in the usual way.

In a first embodiment, the liquid crystal material was the ferroelectric smectic material made by Merck under the number ZLI-3654. This material has such a high viscosity at 20° C. that a drop of this material is not forced through a filling hole of usual size into the evacuated cell when the latter, closed with such a drop, is exposed to atmospheric pressure. It must rather be heated to approximately 90° C. so that a filling process of sufficient speed can be achieved. At 76° C. this material undergoes a transformation from the smectic to the cholesteric phase. The clearing temperature lies in the region of 86° C. If the clearing temperature is exceeded, the viscosity of the material becomes very low. However, the filling process then occurs with such rapidity, depending on the size of the filling hole, that the aligning properties of an orientation layer can be disturbed.

In another embodiment, the TFT mixture ZLI-3033 made by Merck was used. This had to be cooled to about −30° C. to obtain a sufficiently high viscous drop for closing a cell. At 20° C., this material is so fluid that a filling process of satisfactory speed can be attained. It is therefore unnecessary to place a cell in an oven regardless of whether the drop volume is sufficient to fill the cell or whether the cell must be immersed in a boat containing liquid crystal material.

When filling a cell, attention has to be paid to the viewpoint that a drop of such a size is obtained, especially through the different surface forces at different temperatures, that its volume is with certainty sufficient to fill the cell. The drop volume is preferably selected so that it is on average a little larger than the cell volume. Then even the volume of drops of under-average size is still sufficient to fill the whole cell. In the case of drops of average or even over-average size, superfluous material is wiped away at the end of the filling process. Then the filling hole situated in a corner of the cell is closed.

What is claimed is:

1. Process for filling a liquid crystal cell, having at least one corner and a filling hole located in a corner, with a liquid crystal material, characterized in that
   the liquid crystal cell is evacuated in a vacuum jar,
   the evacuated liquid crystal cell is lowered to such an extent that its filling hole is immersed into a container containing liquid crystal material,
   the liquid crystal cell is raised until the corner with the filling hole is separated from the liquid crystal material, whereby a drop of liquid crystal material remains attached to the said corner, and whereby the volume of the liquid crystal cell is dimensioned so that the drop volume is sufficient to fill the cell interior,
   the vacuum jar is quickly aerated,
   and the liquid crystal cell is removed from the vacuum jar and held with the filling hole downwards until the cell interior is filled by the liquid crystal material of the attached drop.

2. Process according to claim 1, characterized in that a liquid crystal cell which is to be filled with liquid crystal material which is of low viscosity at room temperature is cooled in the region on the filling hole so that the liquid crystal material is not sucked in too quickly.

3. Process according to claim 1, characterized in that a liquid crystal cell to be filled with liquid crystal material which is of higher viscosity at room temperature is heated after it has been removed from the vacuum jar.

4. Process according to claim 1, characterized in that the liquid crystal material in the container is maintained at a temperature determined by the physical characteristics of the liquid crystal material and the size of the filling hole, so that the drop of liquid crystal material has a sufficient volume to fill the predetermined volume of the liquid crystal cell.

5. Process according to claim 4, characterized in that after the liquid crystal cell is removed from the vacuum jar, the temperature of the drop of liquid crystal material is raised to reduce its viscosity, thereby allowing the liquid crystal material to flow through the filling hole and fill the liquid crystal cell.

6. Process for filling a liquid crystal cell with a liquid crystal material, said liquid crystal cell having at least one corner, a predetermined interior volume and a filling hole located at a corner of the cell, said process characterized in that:
   the liquid crystal cell is evacuated in a vacuum jar;
   the evacuated liquid crystal cell is lowered to such an extent that its filling hole is immersed into a container containing liquid crystal material;
   the liquid crystal cell is raised until the filling hole is above the liquid crystal material, whereby a drop of liquid crystal material remains attached to said liquid crystal cell and covers said filling hole;
   the vacuum jar is quickly aerated; and
   the liquid crystal cell is removed from the vacuum jar and held with its filling hole downward until the cell interior is filled by the liquid crystal material of the attached drop.

7. Process according to claim 6, characterized in that a plurality of liquid crystal cells are filled simultaneously using a single vacuum jar.

8. Process according to claim 6, characterized in that after the liquid crystal cell is filled with the liquid crystal material, the filling hole is sealed.

9. Process for filling a liquid crystal cell with a liquid crystal material, said liquid crystal cell having at least one corner, a predetermined interior volume and a filling hole located at a corner of the cell, said process characterized in that:
   the liquid crystal cell is evacuated in a vacuum jar;
   the evacuated liquid crystal cell is lowered to such an extent that its filling hole is immersed into a container containing liquid crystal material;
   the liquid crystal cell is raised until the filling hole is above the liquid crystal material, whereby a drop of liquid crystal material remains attached to said liquid crystal cell and covers said filling hole, thereby sealing the filling hole;
   the vacuum jar is aerated;
   the liquid crystal cell is removed from the vacuum jar and held with its filling hole downward so that the filling hole remains sealed by the liquid crystal material;
   the liquid crystal cell is then placed in a oven containing a reservoir of liquid crystal material;
   the liquid crystal cell is lowered so that the filling hole is immersed in the liquid crystal material within the oven;
   the liquid crystal material is heated by the oven so that its viscosity is lowered and the material flows into the liquid crystal cell, with the cell remaining in the oven until it is totally filled; and
   the liquid crystal cell is removed from the oven and the filling hole is sealed.

* * * * *